United States Patent
Zhao et al.

(10) Patent No.: US 8,472,435 B2
(45) Date of Patent: *Jun. 25, 2013

(54) SYSTEM AND METHOD OF WIRELESS DEVICE ACTIVITY MESSAGING

(75) Inventors: Wen Zhao, Cupertino, CA (US); Xin Jin, Waterloo (CA); Haining Zhang, Cupertino, CA (US); Muhammad Khaledul Islam, Kanata (CA)

(73) Assignee: Research In Motion Limited, Waterloo, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 12/858,987

(22) Filed: Aug. 18, 2010

(65) Prior Publication Data

US 2010/0309898 A1 Dec. 9, 2010

Related U.S. Application Data

(63) Continuation of application No. 12/046,867, filed on Mar. 12, 2008, now Pat. No. 7,801,562, which is a continuation of application No. 10/836,245, filed on May 3, 2004, now Pat. No. 7,366,515.

(60) Provisional application No. 60/468,310, filed on May 6, 2003.

(51) Int. Cl.
*H04L 12/66* (2006.01)

(52) U.S. Cl.
USPC ........... 370/352; 370/252; 370/353; 370/354; 370/356; 370/338; 370/395.52; 370/401; 455/414.1; 455/414.2; 455/414.3; 455/445; 709/201; 709/227; 709/228; 709/229

(58) Field of Classification Search
USPC .............. 370/252, 310.2, 328, 338, 352, 353, 370/354, 356, 395.52, 401; 455/414.1–414.3, 455/445; 709/201, 227–229
See application file for complete search history.

(56) References Cited

U.S. PATENT DOCUMENTS

| | | | |
|---|---|---|---|
| 6,119,167 A | 9/2000 | Boyle et al. | |
| 6,421,781 B1 | 7/2002 | Fox et al. | |
| 6,512,930 B2 * | 1/2003 | Sandegren | 455/518 |
| 6,668,173 B2 * | 12/2003 | Greene | 455/445 |
| 6,678,517 B2 * | 1/2004 | Naim et al. | 455/414.1 |

(Continued)

FOREIGN PATENT DOCUMENTS

| | | | |
|---|---|---|---|
| EP | 0758175 | | 6/2005 |
| JP | 2002171281 A | * | 6/2002 |
| WO | 0178425 | | 10/2001 |
| WO | 02096133 | | 11/2002 |

*Primary Examiner* — Olumide T Ajibade Akonai
(74) *Attorney, Agent, or Firm* — Moffat & Co.

(57) ABSTRACT

A method and system of reachability indication between a wireless device and at least one push server, the method comprising the steps of: sending device status information from the wireless device to the at least one push server; and receiving the status information at the at least one push server; wherein the at least one push server is enabled to selectively start and stop serving the wireless device on the basis of the status information. The method further comprises sending status information to a packet data serving node that stores a list of push servers associated with a wireless device, and having the packet data serving node forward the status information to the push server. The system and method further includes selectively starting and stopping the serving of the wireless device by the push server during a voice call.

5 Claims, 9 Drawing Sheets

U.S. PATENT DOCUMENTS

| | | | |
|---|---|---|---|
| 6,707,809 B1 * | 3/2004 | Warrier et al. ............... 370/351 |
| 6,708,206 B1 * | 3/2004 | Thrane et al. ................ 709/219 |
| 6,714,793 B1 | 3/2004 | Carey et al. |
| 6,834,190 B1 * | 12/2004 | Lee et al. ..................... 455/436 |
| 6,856,804 B1 * | 2/2005 | Ciotta ........................ 455/435.1 |
| 6,912,214 B2 * | 6/2005 | Madour et al. ............... 370/340 |
| 7,027,801 B1 * | 4/2006 | Hall et al. ................... 455/412.1 |
| 7,058,691 B1 | 6/2006 | Yu et al. |
| 7,106,706 B1 | 9/2006 | Chaturvedi et al. |
| 7,133,379 B2 * | 11/2006 | Yoshii et al. ................. 370/328 |
| 7,146,404 B2 | 12/2006 | Kay et al. |
| 7,200,633 B2 * | 4/2007 | Sekiguchi et al. ............ 709/203 |
| 7,284,035 B2 | 10/2007 | Yu et al. |
| 7,389,110 B2 | 6/2008 | Lee |
| 2002/0112063 A1 * | 8/2002 | Lohr et al. .................... 709/230 |
| 2002/0122401 A1 | 9/2002 | Xiang et al. |
| 2003/0040280 A1 | 2/2003 | Koskelainen |
| 2003/0109272 A1 | 6/2003 | Mousseau et al. |
| 2003/0120733 A1 * | 6/2003 | Forman ........................ 709/206 |

\* cited by examiner

SYSTEM AND METHOD OF WIRELESS DEVICE ACTIVITY MESSAGING

RELATED APPLICATIONS

The present application is a continuation of U.S. application Ser. No. 12/046,867, filed Mar. 12, 2008, which is a continuation of U.S. Pat. No. 7,366,515, filed May 3, 2004, which claims priority from U.S. provisional application Ser. No. 60/468,310 filed 6 May, 2003, the contents of all of which are incorporated herein by reference.

BACKGROUND

1. Field of the Invention

This invention relates to wireless data devices that access a wireless network, and to infrastructures that route packet data traffic between data servers and wireless data devices within the wireless network. The wireless data devices referred herein include Personal Digital Assistants, mobile communication devices, cellular phones, and wireless two-way communication devices that have packet data processing capability and intended to be used in wireless networks.

2. Description of the Related Art

In a CDMA2000 (1x Code Division Multiple Access) network, the network typically requires a wireless data device to send a power-up registration when powering up. Similarly, the network requires the device to send an explicit power-down registration message when it powers down for any reason. In this way the CDMA2000 network knows that the wireless data device does not require any services and is no longer reachable.

For wireless data devices that support push services, there may be one or more push servers running on different networks managed by different entities. These push servers deliver information such as notification, data and multimedia content to the wireless devices via the wireless IP network. The device's reachability information known to the CDMA2000 network may not be available to the push servers. When a device is not available, the data servers may keep pushing data traffic to an unreachable device, resulting in a waste of network bandwidth and the starvation of available devices.

Packet data services are integrated on top of circuit switched services in CDMA2000 networks. Another problem may arise when a wireless data device does not support concurrent data services and voice services. For instance, when the device is in a voice call, it is unable to accept a data call. In this situation, it is desirable that the data servers stop pushing data to the device temporarily.

SUMMARY

One method which mitigates unnecessary data traffic on the CDMA2000 network includes sending device status information from a wireless data device to its push servers so that the push servers know when to start and when to stop serving the wireless data device.

Another solution is to let a wireless data push server register with the packet data serving node (PDSN) and specify the wireless devices that are associated with it. When the PDSN is informed of a change in device status information, it notifies all the registered push servers associated with that wireless data device.

Alternatively, the PDSN may gather the push server information automatically by examining the header of incoming packet data designated for a specific wireless data device.

After the push servers are notified of the status change of the wireless data devices by the PDSN, the push servers can start or stop pushing data traffic to the wireless networks accordingly. In this way, the data traffic on the wireless network can be reduced to save network resources.

The present invention therefore provides a method for reachability indication between a wireless device and at least one push server, the method comprising the steps of: sending device status information from the wireless device to the at least one push server; and receiving the status information at the at least one push server; wherein the at least one push server is enabled to selectively start and stop serving the wireless device on the basis of the status information.

The present invention further provides a method for reachability indication between a wireless device and at least one push server, the method comprising the steps of: sending device status information from the wireless device to a packet data serving node; receiving the status information at packet data serving node and sending from the packet serving node a status message to the at least one push server, the status message corresponding to the status information; receiving the status message at the at least one push server; wherein the at least one push server is enabled to selectively start and stop serving the wireless device on the basis of the status information.

The present invention still further provides a method for reachability indication between a wireless device and at least one push server, the wireless device being unable to support simultaneous voice and data calls, the method comprising the steps of: sending voice call information from a mobile switching center to a base station controller; sending from the base station controller to a packet data serving node a data status notification; receiving the data status notification at the packet data serving node and sending to the at least one push server status information; and receiving the status information at the at least one push server; wherein the at least one push server is enabled to selectively start and stop serving the wireless device on the basis of the status information.

The present invention yet further provides a push server enabled to selectively start and stop serving a wireless device on the basis of received status information, said push server comprising: a transceiver enabled to receive status information about the wireless device; a processor enabled to interpret status information about the wireless device and to start or stop serving the wireless device based on the status information; and a storage subsystem capable of storing the status information for the wireless device.

The present invention further provides a packet data serving node comprising: a processor; a first transceiver interface for communicating with a base station controller and receiving status information for a wireless device; a second transceiver interface for communicating with a network and for transmitting status information for the wireless device; and a data storage subsystem, said data storage subsystem including: a records storage, said records storage storing data associating a wireless device with at least one push server, wherein said records storage is accessible by said processor upon receipt by said first transceiver interface of the status information for the wireless device, allowing the processor to forward the status information to the at least one push server associated with the wireless device.

The present invention further provides a base station controller comprising: a processor; a first transceiver interface for communicating with a mobile switching center and receiving voice call information for a wireless device; a second transceiver interface for communicating with a packet data serving node and for transmitting status information for the wireless device; and a data storage subsystem, said data storage subsystem including: a records storage, said records storage storing data indicating whether a wireless device can support concurrent voice and data calls and whether the wireless device is in a voice call; wherein said records storage is accessible by said processor upon receipt by said first transceiver interface of the voice call information for the wireless device, allowing the processor to forward the status information to the packet data switching network.

The present invention further provides a wireless data device comprising: a processor, a user interface communicating with the processor for providing input to the wireless data device, a transceiver interface controlled by said processor for communicating with a wireless network, a storage subsystem communicating with said processor and having information about push servers serving said wireless data device, wherein said wireless data device communicates status information to the push servers serving the wireless devices using said transceiver over said wireless network.

BRIEF DESCRIPTION OF THE DRAWINGS

The same reference numerals are used in different Figures to denote similar elements.

DETAILED DESCRIPTION

Figure 1:
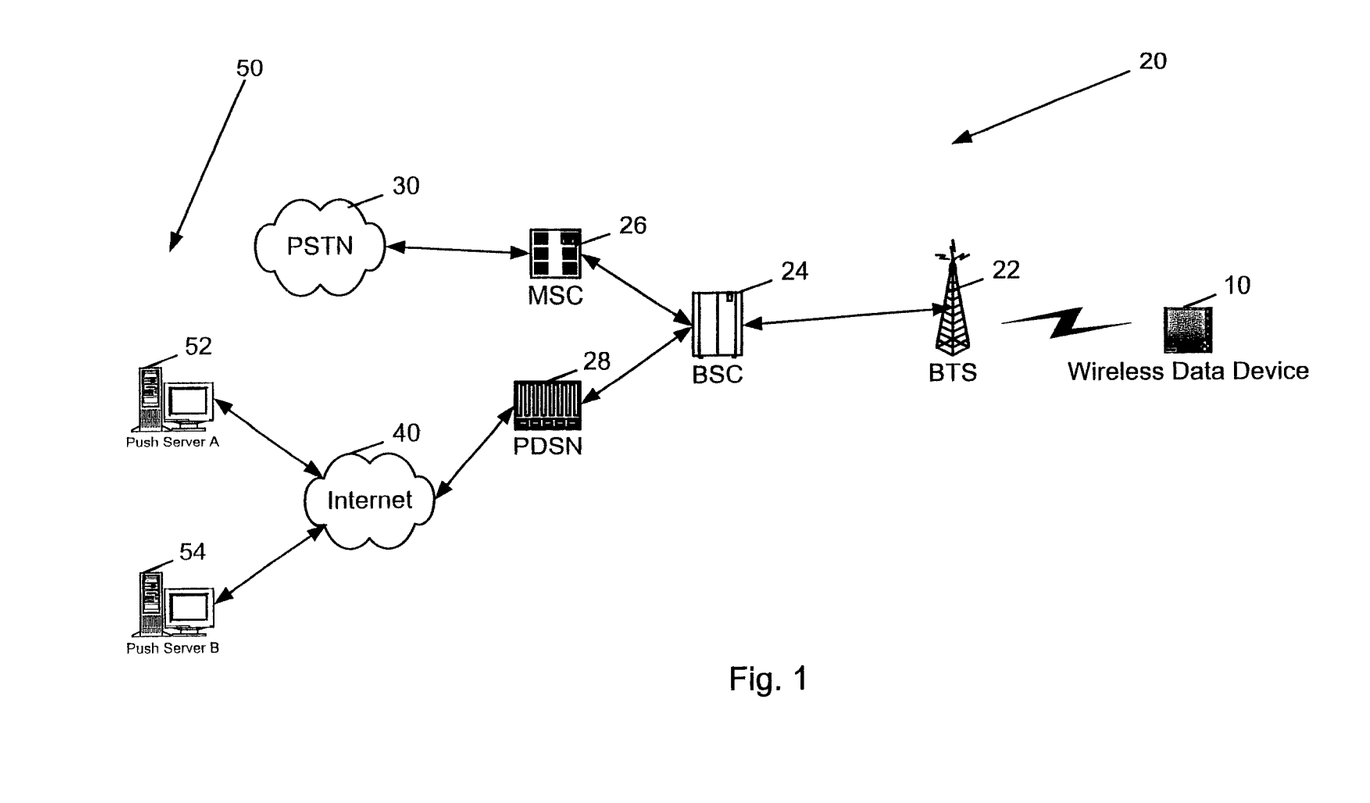
FIG. 1 is a block diagram of an exemplary CDMA2000 wireless data network system in accordance with the present application and with which the various embodiments of the method of the instant application may cooperate.

Referring to FIG. 1, FIG. 1 is a block diagram of an exemplary CDMA2000 wireless data network system in accordance with the present application and with which the various embodiments of the method of the instant application may cooperate. FIG. 1 shows a block diagram of a wireless data device 10, an exemplary 1x Code Division Multiple Access (CDMA2000) mixed circuit switched and packet switched network 20, a Public Switched Telephone Network (PSTN) 30, Internet 40 and push servers 50 with which the instant techniques of this application may cooperate. The wireless data device 10 is preferably a two-way communication device having data and/or voice communication capabilities.

CDMA2000 network 20 includes mixed circuit and packet switched components—Base Transceiver Subsystem (BTS) 22 and Base Station Controller (BSC) 24, a circuit switched only component—Mobile Switching Centre (MSC) 26, and a packet switched only component—Packet Data Serving Node (PDSN) 28.

Operationally, mobile device 10 communicates wirelessly with BTS 22 and BSC 24 to gain access to circuit switched services provided by MSC 26, such as voice and short message service (SMS) via PSTN 30.

Mobile device 10 also communicates wirelessly with BTS 22 and BSC 24 to gain access to packet data services provided by PDSN 28, such as e-mail, wireless application protocol (WAP), and other data services via Internet 40.

Figure 2:
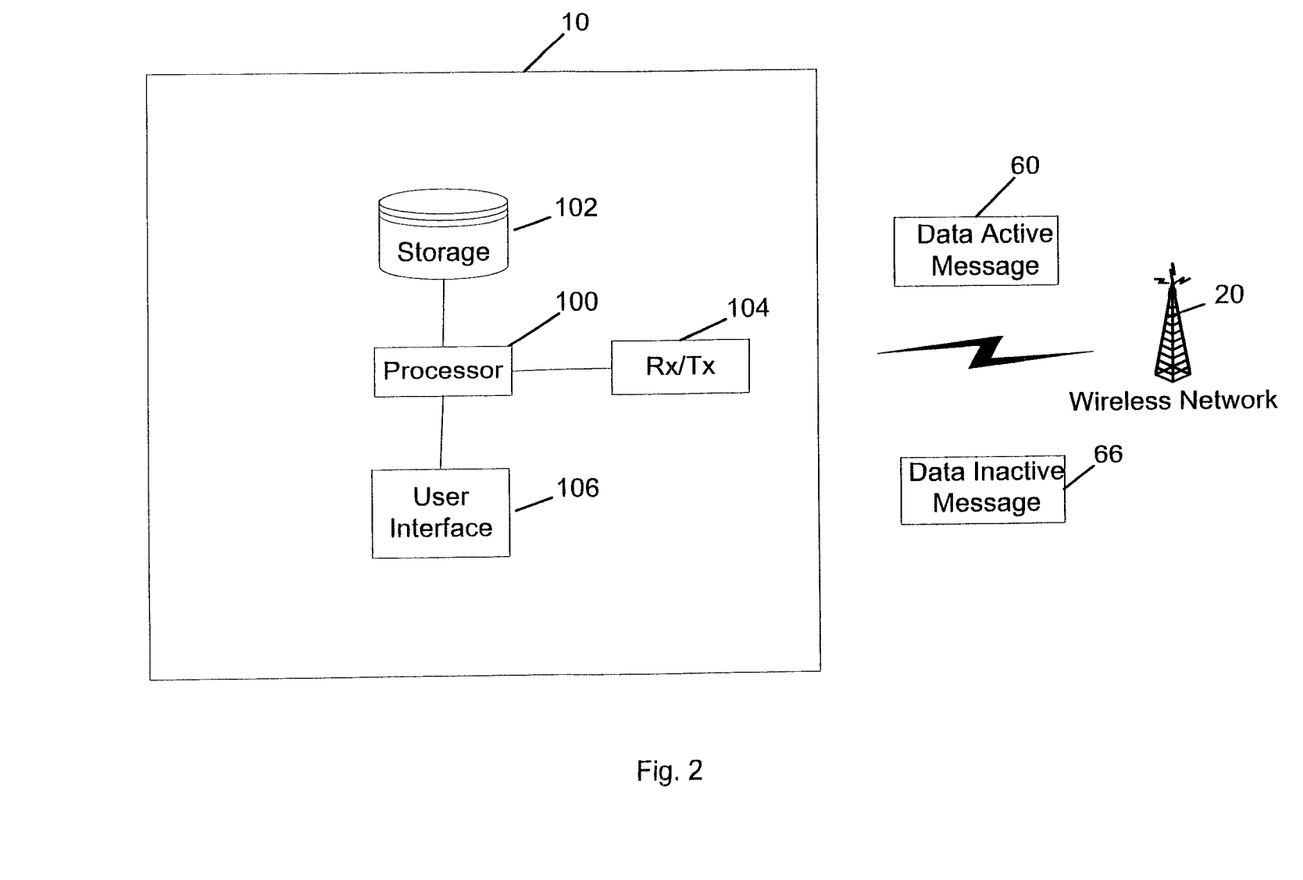
FIG. 2 is a block diagram of an exemplary wireless data device for use with the method of the present application.

FIG. 2 is a block diagram of an exemplary wireless data device for use with the method of the present application. Reference is still made to FIG. 1 for individual components within wireless network 20. The wireless data device 10 is preferably a two-way communication device having at least data or data/voice communication capabilities. Where the device 10 is enabled for two-way communications, the device will incorporate a processor 100, a storage subsystem 102, a transceiver subsystem 104 and a user interface module 106. The microprocessor 100 controls the overall operation of the wireless data device. Communication functions, including signaling between wireless data device 10 and wireless network 20, signaling between wireless data device 10 and push servers 50, and data/voice communications, are performed through the transceiver subsystem 104. The microprocessor 100 also interacts with further device subsystems such as the storage subsystem 102 and the user interface module 106. In CDMA2000 network, signaling between wireless data device 10 and wireless network 20, for instance, includes power up and power down registrations. Users may command the operation of the wireless data device 10 through the user interface module 106, for instance power up and power down the wireless data device 10, making data and/or voice calls.

The present method and application provide for signaling between wireless data device 10 and push servers 50 that includes conveying status information about wireless data device 10 through a Data Active Message 60 and Data Inactive Message 66.

A predetermined set of applications that control basic device operations, including at least data communication applications for example, will normally be installed on the device 10 during manufacture. A set of applications that may be loaded onto the device includes, but is not limited to e-mail, calendar events, appointments, browser and task items. Such applications would have the ability to send and receive data items, via the CDMA2000 network 20 and Internet 40 (not shown), to and from push server 50. For voice communications, device 10 communicates with PSTN 30 (not shown) via the CDMA2000 network 20.

When the wireless data device 10 powers up, it sends a power up registration to BSC 24. When the required power up registration has been completed, the wireless data device 10 may send and receive communication signals over CDMA2000 network 20.

When the wireless data device 10 powers down, it sends a power down registration to BSC 24. When the required power down registration has been completed, the CDMA2000 network 20 stops serving the wireless data device 10.

Figure 3:
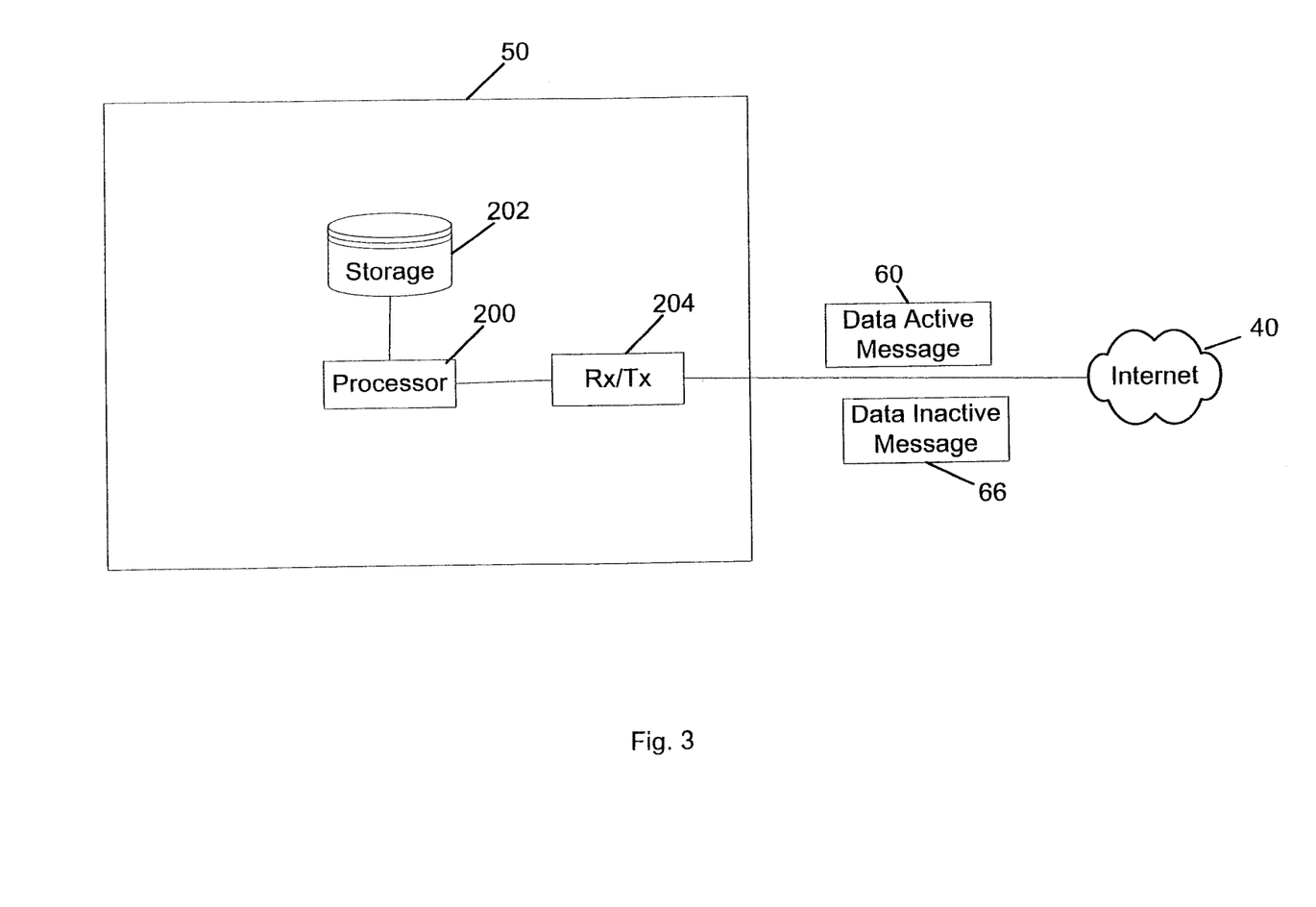
FIG. 3 is a block diagram of an exemplary push server for use with the method of the present application.

FIG. 3 is a block diagram of an exemplary push server for use with the method of the present application. The push server 50 incorporates at least one microprocessor 200, a storage subsystem 202, and a transceiver subsystem 204.

The microprocessor 200 controls the overall operation of the push server. Microprocessor 200 interacts with storage subsystem 202, and transceiver subsystem 204. Communication functions, including signaling between push server 50 and wireless network 20, signaling between push server 50 and wireless data device 10, and data communications, are performed through the transceiver subsystem 204. Signaling between push server 50 and wireless network 20 as well as signaling between push server 50 and wireless data device 10 include, but are not limited to, receiving status information about wireless data device 10. Further, a Data Active Message 60 and Data Inactive Message 66 are sent to push server 50.

Push server 50 communicates with the wireless network 20 and with wireless data device 10 via Internet 40, as seen in FIG. 1.

Figure 4:
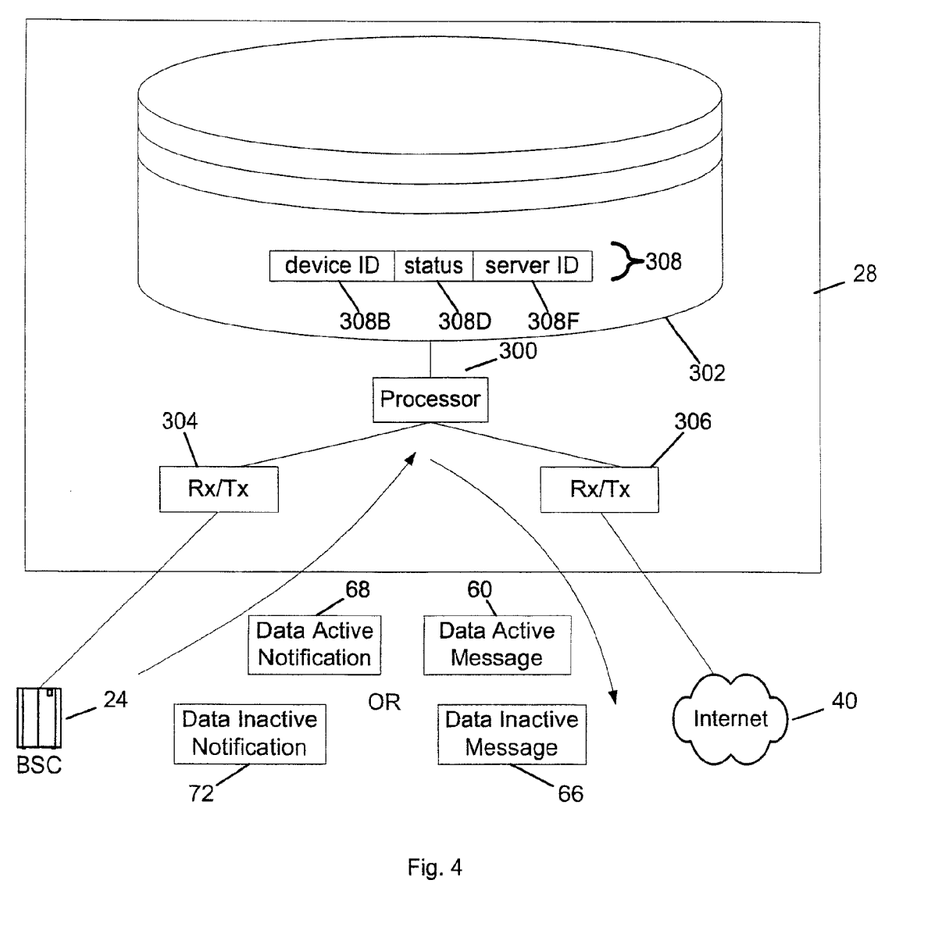
FIG. 4 is a block diagram of an exemplary PDSN for use with the method of the present application.

FIG. 4 is a block diagram of an exemplary PDSN for use with the method of the present application. Operationally it includes at least one processor 300, a storage subsystem 302, and two transceiver interfaces 304 and 306. The first transceiver interface 304 is used to receive status information of wireless data device 10 (not shown). In present the method and application, this includes a Data Active Notification 68 or Data Inactive Notification 72 from BSC 24. These messages are used to indicate whether the wireless data device 10 will accept data using the Data Active Notification 68, or will not accept data using the Data Inactive Notification 72.

The second transceiver 306 is used to send information to push server 50, as seen in FIG. 1. Using the present method and application, transceiver 306 can include a Data Active Message 60 or a Data Inactive Message 66 sent to push server 50 via internet 40, as illustrated in FIG. 1. These messages tell push server 50 that wireless data device 10 will accept data (Data Active Message 60) or not accept data (Data Inactive Message 66).

In one embodiment, Storage subsystem 302 stores a system record 308. Each system record 308 represents all information for one wireless data device 10 and includes a device identifier field 308B to store identifier information for a wireless data device 10. Record 308 further preferably includes a device status field 308D, as well as push server identifier field 308F for identifying all push servers 50 associated with wireless data device 10.

Processor 300 controls overall operation of PDSN 28. When a Data Active Notification 68 arrives at transceiver interface 304, the processor 300 examines its system record 308 stored in storage subsystem 302 and retrieves all of the push server identifiers stored in push server identifier field 308F associated with the wireless data device 10, as located based on device identifier field 308B. Processor 300 sends out Data Active Message 60 to all the push servers 50 (not shown) via transceiver interface 306 and Internet 40 on behalf of wireless data device 10, after which all push servers may commence serving the wireless data device 10 by pushing data traffic onto wireless network 20. The device status field 308D is updated accordingly.

Similarly when a Data Inactive Notification 72 arrives at transceiver interface 304, the processor 300 examines its system record 308 stored in storage subsystem 302 and retrieves all push server identifiers stored in push server identifier field 308F associated with that wireless data device 10, as located in device identifier field 308B. Processor 300 then sends out Data Inactive Message 66 to all push servers 50 via transceiver interface 306 and internet 40 on behalf of wireless data device 10, after which all push servers may safely cease serving the wireless data device 10 by terminating pushing data traffic onto the wireless network 20. The device status field 308D is updated accordingly.

Figure 5:
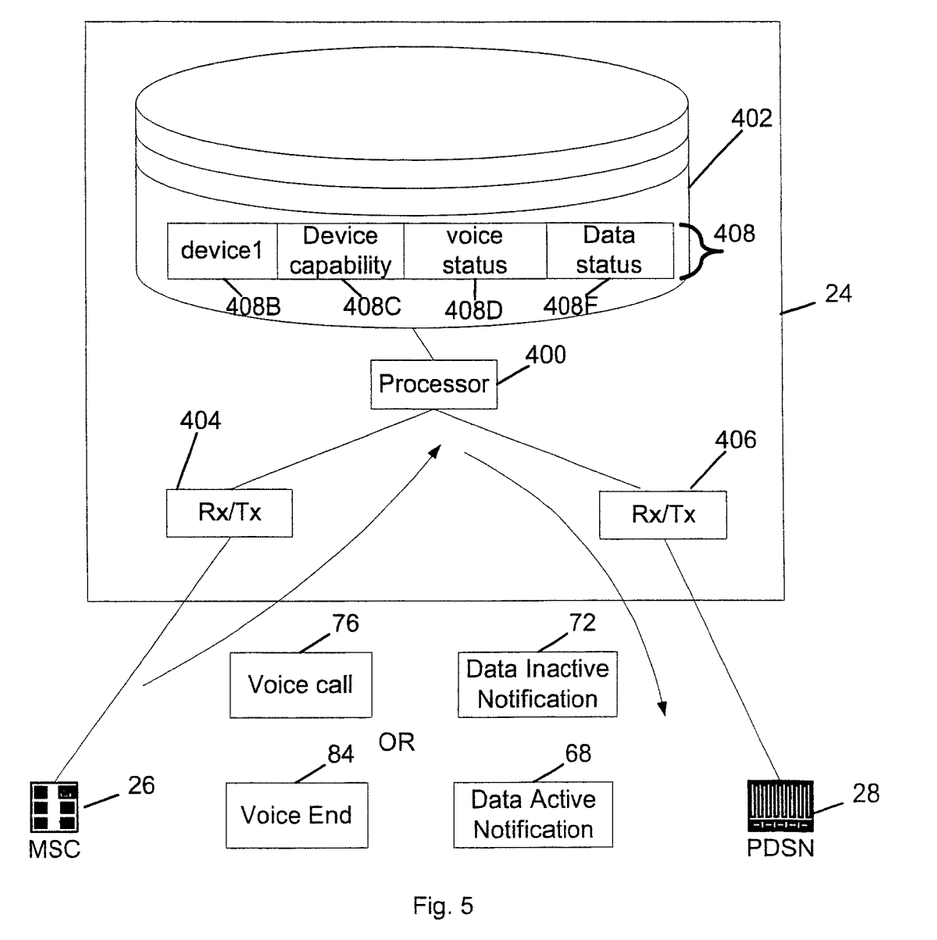
FIG. 5 is a block diagram of an exemplary BSC for use with the method of the present application.

FIG. 5 is a block diagram of an exemplary BSC for use with a further method of the present application. It is applicable when both voice and data capabilities are available on wireless data device 10 but voice and data calls cannot be supported simultaneously. Operationally it includes at least one processor 400, a storage subsystem 402, and two transceiver interfaces 404 and 406.

Storage subsystem 402 preferably has a system record 408. Each system record 408 represents information for one wireless data device 10 and includes a device identifier field 408B for storing identifiers for wireless data device 10. System record 408 further preferably includes a device capability indicator field 408C (to indicate whether the device associated with the device identifier field can support concurrent voice and data calls), a device voice call status field 408D, as well as device data call status field 408F.

Processor 400 controls the overall operation of BSC 24. When a Voice Call Notification 76 arrives at transceiver interface 404, the processor 400 examines its system record 408 stored in storage subsystem 402 and finds out through device capability indicator field 408C whether voice call and data call can be supported simultaneously at wireless data device 10. If voice call and data call cannot be supported simultaneously at wireless data device 10, processor 400 further finds out through data call status field 408F whether there exist any on-going push services. If at least one on-going push service exists, processor 400 will update voice call status field 408D, data call status field 408F and send out a Data Inactive Notification 72 to PDSN 28 via transceiver interface 406. PDSN 28 may update push server 50 with the new status of wireless data device 10 accordingly as described above with reference to FIG. 4.

Similarly when a Voice End Notification 84 arrives at transceiver 404, the processor 400 examines its system record 408 stored in storage subsystem 402 and finds out through device capability indicator field 408C whether voice call and data call can be supported simultaneously at wireless data device 10. If device capability indicator field 408C indicates that voice call and data call cannot be supported simultaneously by device 10, processor 400 further finds out through data call status filed 408F whether there existed any on-going push services at the time of the voice call setup. If any of these push data services existed, processor 400 will send out a Data Active Notification 68 to PDSN 28 via transceiver interface 406. PDSN 28 may update push server 50 with the new status of wireless data device 10 accordingly as described above with reference to FIG. 4. Voice call field 408D and data call field 408F will be updated accordingly.

Figure 6:
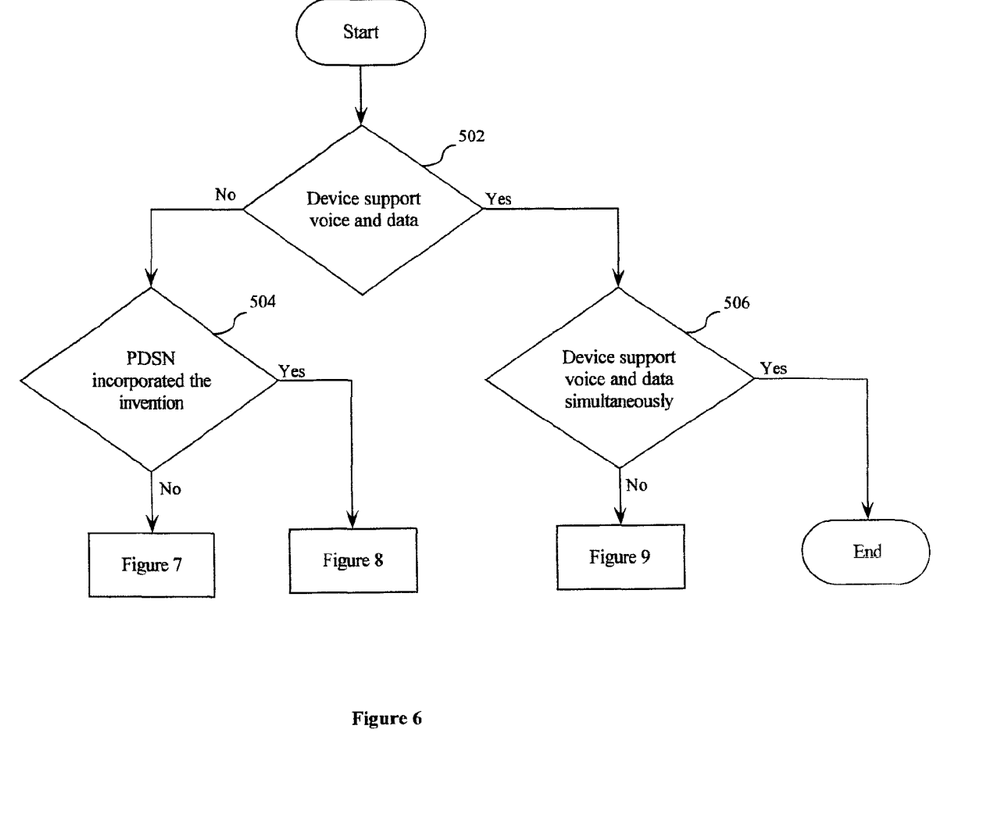
FIG. 6 illustrates various embodiments of the techniques of the present application in terms of a flow chart.

FIG. 6 illustrates a flow chart of the above embodiments of the present application. If wireless data device 10 does not support voice operations, as identified in step 502, then data communications are the sole concern, and processing proceeds to step 504.

In step 504 a determination is made about whether the PDSN is incorporated into the present method and application. Without the PDSN being incorporated, the present method and application can be applied between the wireless data device 10 itself and push server 50, which is described below referring to FIG. 7. Conversely, if in step 504 PDSN 28 is incorporated with the present method and application, the wireless data device 10 communicates with PDSN 28, which in turn communicates with push servers 50, as detailed below referring to FIG. 8.

If wireless data device 10 supports both data calls and voice, as found in step 502, a check in step 506 is made to determine whether wireless data device 10 supports concurrent voice and data calls. If wireless data device 10 does not support concurrent voice calls and data calls, the present method and application allows BSC 24 to communicate status information to PDSN 28, and push servers 50, as detailed below in FIG. 9.

If in step 506 it is determined that wireless data device 10 supports concurrent voice and data calls then push server 50 does not need to cease pushing data calls when the device is active, and the process could end. However, as will be realized by those skilled in the art, the methods of FIG. 7 or 8 could still be used to disable pushing of data when the wireless data device 10 is turned off or out of radio coverage.

Figure 7:
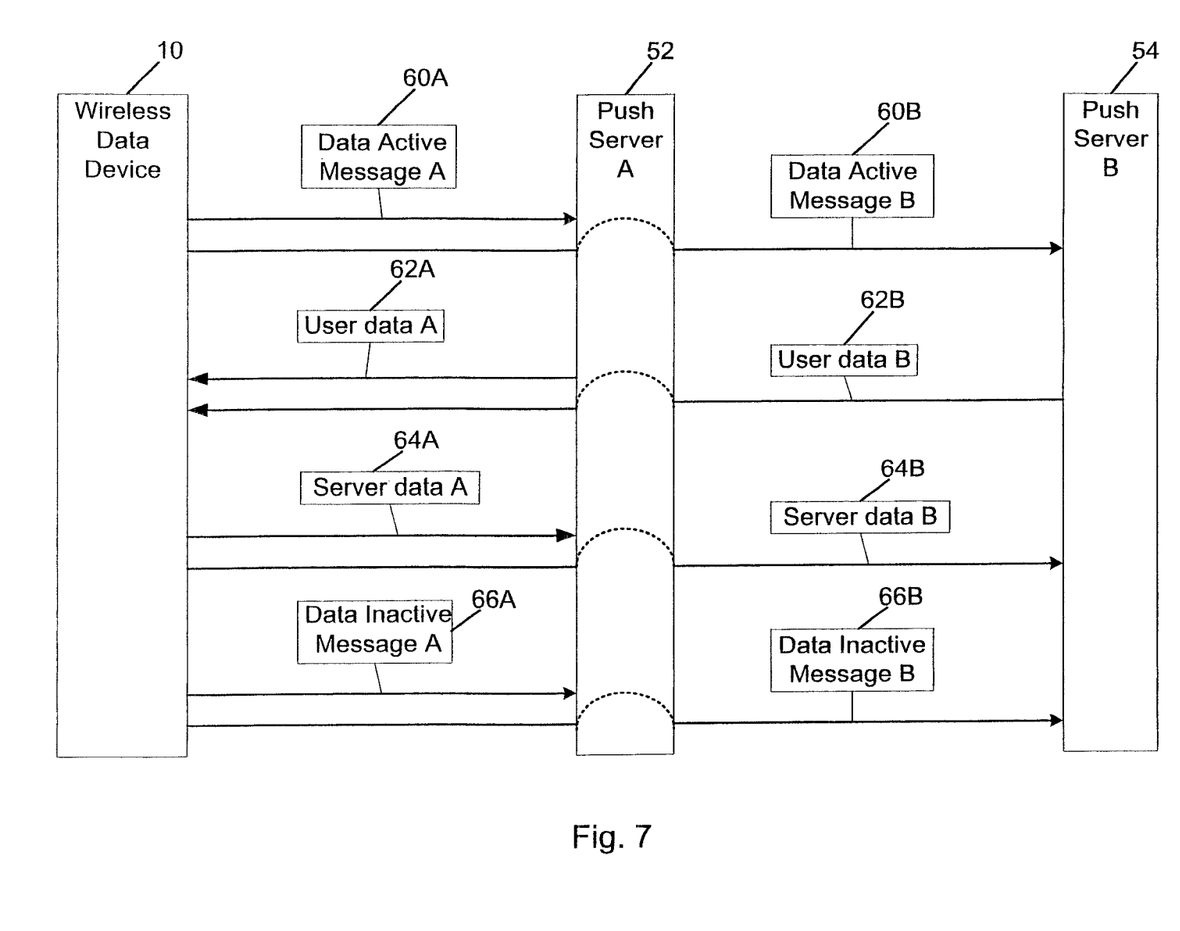
FIG. 7 illustrates in greater detail the signaling and data flow between the wireless data device, and two push servers in accordance with a first embodiment of a method of the present application.

Referring now to FIG. 7, this Figure illustrates in greater detail the signaling and data flow between wireless data device 10, and two push servers 52 and 54 in accordance with a first embodiment of a method of the present application.

When the wireless data device 10 powers up, it notifies its data active status by sending Data Active Message 60A and Data Active Message 60B to push servers 52 and 54 respectively. After receiving Data Active Message 60A and 60B, data servers 52 and 54 start serving the wireless data device 10. For example, user data 62A and 62B and server data 64A and 64B can be exchanged between wireless data device 10 and push servers 52 and 54 respectively.

When the wireless data device 10 powers down, it notifies its data inactive status by sending a Data Inactive Messages 66A and 66B to push servers 52 and 54 respectively. After receiving Data Inactive Message 66A and 66B, data server 52 and 54 stop serving the wireless data device 10, preventing user data 62A and 62B from flowing in CDMA2000 network 20.

The dashed curve lines of FIG. 7 within push server 52 are meant to indicate that the corresponding signaling and data traffic is between wireless data device 10 and push server 54, and does not actually flow through push server 52.

Figure 8:
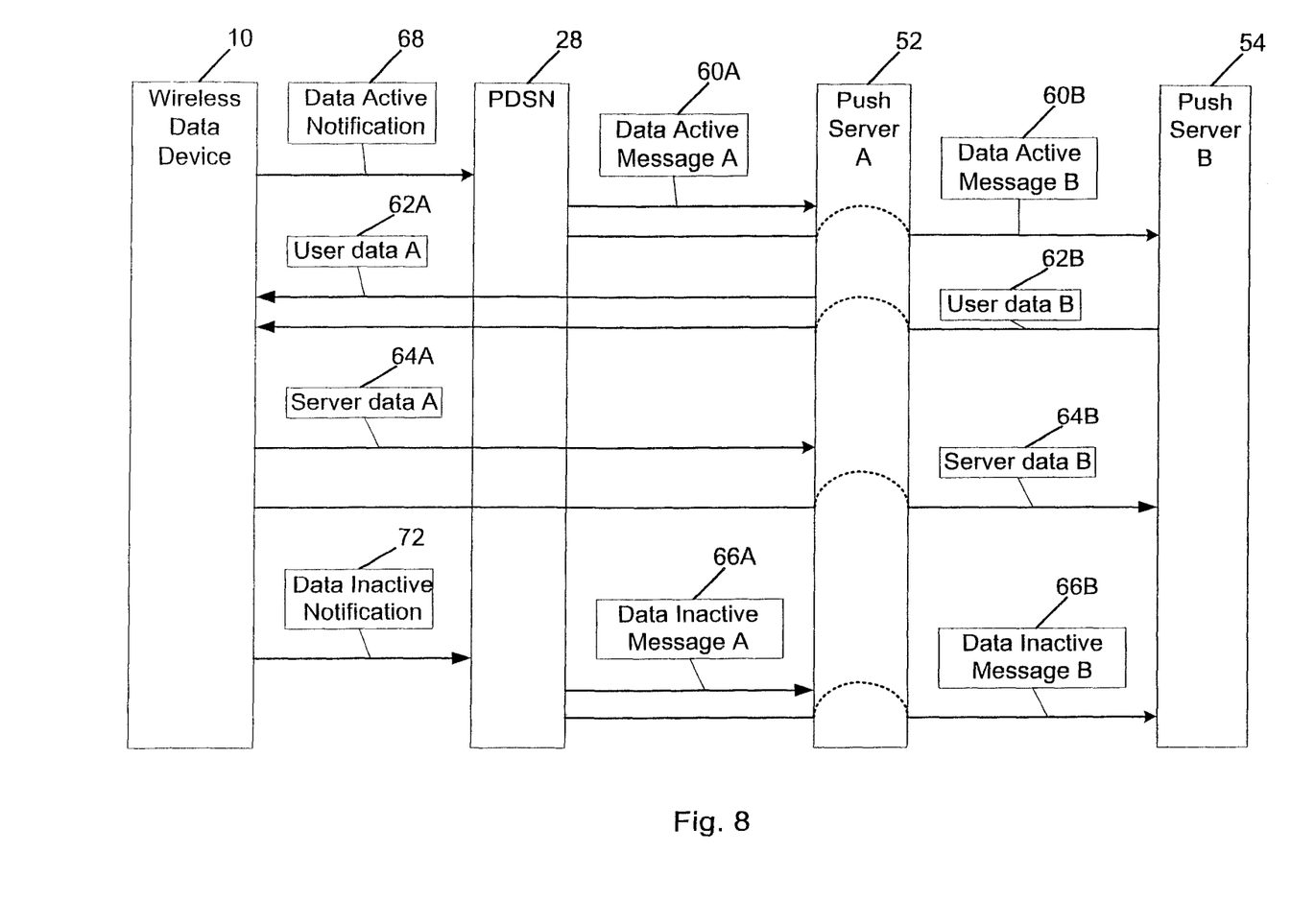
FIG. 8 illustrates in greater detail the signaling and data flow among the wireless data device, PDSN and two push servers in accordance with a second embodiment of the method of the present application.

An improvement to the method of FIG. 7 is to have wireless data device 10 only send one message, rather than a message to each of the push servers 50. This saves battery life of wireless data device 10 and network resources of wireless network 20. Reference is now made to FIG. 8.

FIG. 8 illustrates in greater detail the signaling and data flow between wireless data device 10, PDSN 28 and two push servers 52 and 54 in accordance with a second embodiment of the method of the present application. When the wireless data device 10 powers up it notifies PDSN 28 via BSC 24 with a Data Active Notification 68. PDSN 28 in turn sends out Data Active Message 60A and 60B to push servers 52 and 54. As one skilled in the art will realize, different number of push servers 50 could exist for wireless data device 10, and if more push servers exist, Data Active Message 60 will be sent to these push servers as well.

As illustrated in FIG. 4, push servers 52 and 54 are registered within server identifier field 308F associated with the wireless device identifier for wireless data device 10 at PDSN 28.

After push servers 52 and 54 receive Data Active Messages 60A and 60B respectively, user data 62A and 62B and server data 64A and 64B can be exchanged between the wireless data device 10 and the push servers 52 and 54 respectively. In CDMA2000 network, Data Active Notification 68 may be associated with a Power Up Registration.

Likewise, when wireless data device 10 powers down, PDSN 28 is notified via BSC 24 using a Data Inactive Notification 72. PDSN 28 then sends out Data Inactive Message 66A and 66B to push servers 52, 54. In CDMA2000 network, this Data Inactive Notification 72 may be associated with Power Down Registration.

Based on the above, by using the method of FIG. 8, wireless data device 10 does not have to send out multiple Data Active Messages and Data Inactive Messages, thereby increasing its battery life, and reducing over the air traffic.

As with FIG. 7, the dashed lines flowing over push server 52 indicate that the signaling and data traffic is between wireless data device 10 and push server 54, and does not flow through push server 52.

Figure 9:
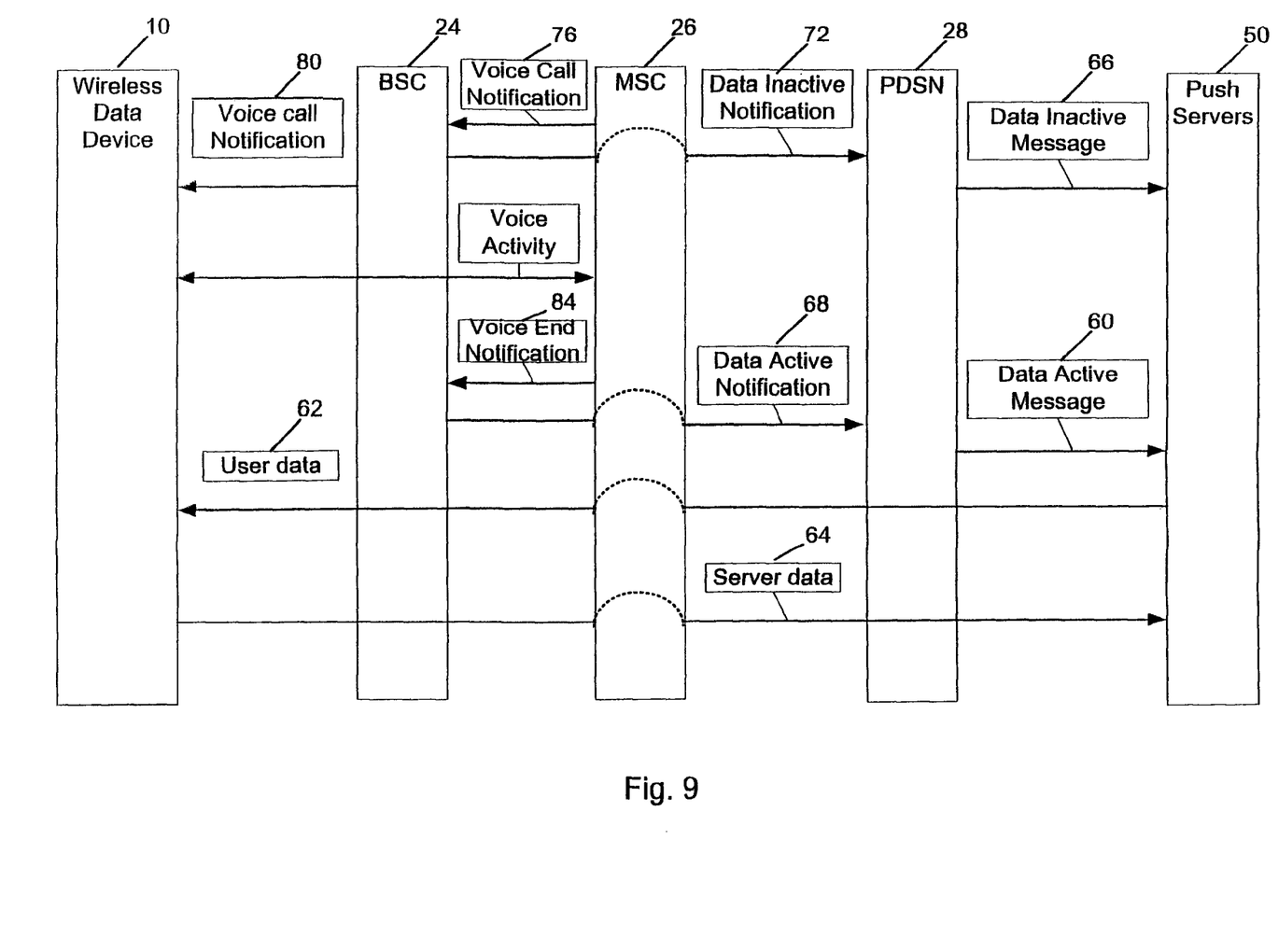
FIG. 9 is a detailed signal flow diagram illustrating the signaling, voice and data flow among the wireless data device, BSC, MSC, PDSN and push servers in accordance with a third embodiment of the a method of the present application.

In some cases it is desirable to further prevent push servers 50 from pushing data during a voice call when wireless data device 10 does not support concurrent voice and data calls. Reference is now made to FIG. 9.

FIG. 9 illustrates a signal flow diagram showing the signaling, voice and data flow among the wireless data device 10, BSC 24, MSC 26, PDSN 28 and push servers 50 in accordance with a further embodiment of the a method of the present application. FIG. 9 illustrates the interaction between a voice call and data call when voice and data cannot be supported simultaneously on wireless data device 10.

Initially the wireless data device 10 is in a data (active or dormant) mode of an on-going push service. When a voice call comes in, MSC 26 notifies BSC 24 using Voice Call Notification 76. BSC 24 realizes that wireless data device 10 is in a data (active or dormant) mode based on system record 408 through data call status field 408F as outlined above with regards to FIG. 5.

BSC 24 sends a Data Inactive Notification 72 to PDSN 28. After receiving Data Inactive Notification 72, PDSN 28 notifies all push servers 50 that registered with it using a Data Inactive Message 66. All push servers 50 stop pushing data onto the network for device 10 based on this message.

When the voice call ends, MSC 26 sends a Voice End Notification 84 to BSC 24. BSC 24 then notifies PDSN 28 using a Data Active Notification 68. After receiving Data Active Notification 68, PDSN 28 sends out a Data Active Message 60 to all push servers that are associated with wireless data device 10 and registered with PDSN 28. Push servers can then start exchanging user data 62 and server data 64 with wireless data device 10.

The dashed curve line in MSC 26 indicates that the signaling and data traffic are either between wireless data device 10 and push servers 50 or between BSC 24 and PDSN 28. They do not flow through push data MSC 26.

The embodiments of FIGS. 8 and 9 require all push servers 50 desirous of communicating with wireless data device 10 to register with PDSN 28. In an alternative embodiment, the PDSN may gather push server information automatically by examining the header of each packet data designated for that wireless data device 10.

The embodiments described herein are examples of structures, systems or methods having elements corresponding to elements of the application. This written description may enable those skilled in the art to make and use embodiments having alternative elements that likewise correspond to the elements of the application. The intended scope of the application thus includes other structures, systems or methods that do not differ from the application as described herein, and further includes other structures, systems or methods with insubstantial differences from the application as described herein.

The invention claimed is:

1. A method for selectively starting and stopping serving a data capable wireless device from a push server that is registered with a packet data serving node ('PDSN'), the data capable wireless device being registered with a wireless network, the method comprising:

a. receiving status information at the push server via the Internet, the status information indicating whether the data capable wireless device is currently available to receive data; and
b. selectively starting and stopping serving the data capable wireless device at the push server on the basis of the status information.

2. The method of claim 1, wherein the status information is received from the data capable wireless device or the PDSN.

3. The method of claim 1, wherein the data capable wireless device is unable to support concurrent voice and data calls.

4. The method of claim 1, wherein the status information is a data active message.

5. The method of claim 1, wherein the status information is a data inactive message.

* * * * *